United States Patent
Ozue

(10) Patent No.: US 6,922,298 B2
(45) Date of Patent: Jul. 26, 2005

(54) MAGNETIC TAPE RECORDING APPARATUS FOR RECORDING TRACKS HAVING SAME TRACK PITCH

(75) Inventor: Tadashi Ozue, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/867,116

(22) Filed: Jun. 14, 2004

(65) Prior Publication Data

US 2005/0018343 A1 Jan. 27, 2005

(30) Foreign Application Priority Data

Jun. 20, 2003 (JP) ..................................... P2003-175834

(51) Int. Cl.$^7$ ............................................. G11B 15/14
(52) U.S. Cl. ...................................................... 360/64
(58) Field of Search ............................. 360/64, 76, 18, 360/20, 21, 22, 23, 24, 73.01

(56) References Cited

U.S. PATENT DOCUMENTS 6,424,482 B2 * 7/2002 Yanagawa et al. ......... 360/72.1
6,671,455 B1 * 12/2003 Kobayashi et al. ........... 386/88

\* cited by examiner

*Primary Examiner*—David Hudspeth
*Assistant Examiner*—Daniell L. Negron
(74) *Attorney, Agent, or Firm*—Sonnenchein, Nath & Rosenthal LLP

(57) ABSTRACT

In a helical scan type magnetic tape recording apparatus, one thin film multi-recording head is mounted on a rotary drum, wherein the multi-recording head includes N recording heads for recording N recording tracks at a predetermined track angle on a magnetic tape by one rotation of the rotary drum to perform recording for forming continuous recording tracks having the same track pitches, by determining rotary drum rotation and a tape speed in accordance with equation $V1=Tp \cdot N \cdot (RPS)/\sin \theta$, such that (N−1) recording tracks having the same track pitches narrower than the head width and one recording track having a wider track width than that are formed by a first rotation of the drum, then by a second rotation, a preceding recording head overwrites the recording track having the wider track width to form a recording track having a track width equal to the track width of the recording track.

16 Claims, 11 Drawing Sheets

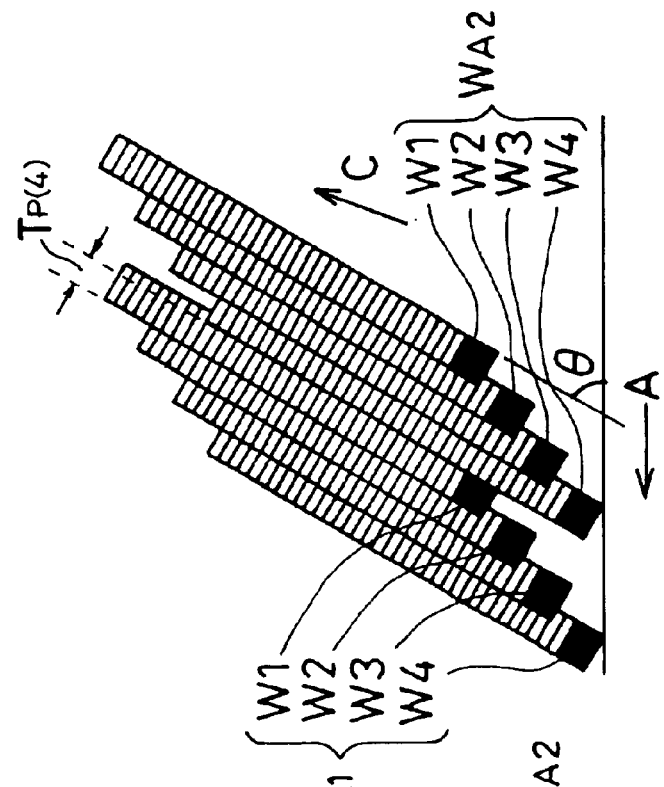
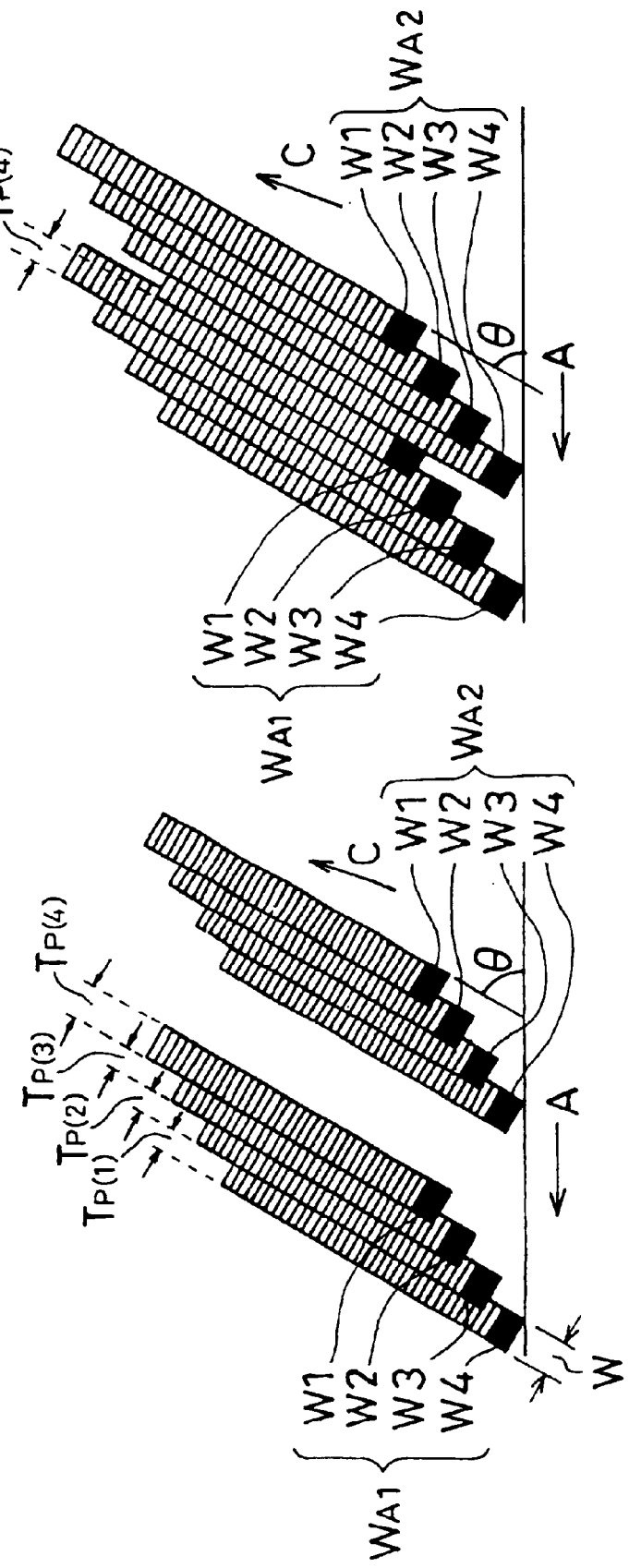

MAGNETIC TAPE RECORDING APPARATUS FOR RECORDING TRACKS HAVING SAME TRACK PITCH

CROSS REFERENCE TO RELATED APPLICATION

This application claims priority from Japanese Priority Document No. 2003-175834, filed on Jun. 20, 2003 with the Japanese Patent Office, which document is hereby incorporated by reference.

BACKGROUND OF THE INVENTION

1. Field of the Invention

The present invention relates to a helical scan type magnetic tape recording apparatus that records a plurality of recording tracks simultaneously with a thin film multihead having a plurality of head gaps, and in which the number of rotations of a rotary drum and a tape speed are determined so as to form recording tracks having the same track pitches.

2. Description of Related Art

Conventionally, as a helical scan type magnetic tape recording apparatus, there has been proposed in, for example, the following Patent Documents 1 and 2.

Patent Document 1: Japanese Patent Publication No. Heisei-8-34025

Patent Document 2: Japanese Patent No. 2513204

In the conventional helical scan type magnetic tape recording/reproducing apparatus as disclosed in the Patent Documents 1 and 2, a multi-recording head having a plurality of heads or head gaps, and a multi-reproducing head having a plurality of heads or head gaps are disposed on a rotary drum. The multi-recording head records simultaneously a plurality of recording tracks, and the multi-reproducing head reproduces simultaneously a plurality of recording tracks.

As a recording head for a helical scan type magnetic recording apparatus, there has been proposed one that employs a thin film multi-recording head (a recording element having a plurality of heads or head gaps) using a thin film element as disclosed in the Patent Document 3, for example.

Patent Document 3: Japanese Patent Application Laid-open No. 2002-216313

A thin film multi-recording heads of the above Patent Document 3 is now described with reference to FIG. 15 and FIG. 16. A thin film multi-recording head 10 is composed of a lower non-magnetic substrate 11, a lower insulating layer 12 and a lower magnetic shield layer 13a that are laminated on the lower non-magnetic substrate 11, an U-shaped core 16a formed integrally with the lower magnetic shield layer 13a, a first thin film recording head W1 composed of a coil 17a wound around the core 16a and a protection layer 18a thereof, an intermediate magnetic shield layer 19 and a lower magnetic shield layer 13b that are laminated on the protection layer 18a, an U-shaped core 16b formed integrally with the lower magnetic shield layer 13b, a second thin film recording head W2 composed of a coil 17b wound around the core 16b and a protection layer 18b thereof, and an upper insulating layer 20 and an upper non-magnetic substrate 21 that are laminated on the protection layer 18b. The thin film recording heads W1 and W2 are formed at locations shifted in the direction of lamination.

The lower non-magnetic substrate 11 and the upper non-magnetic substrate 21 are, for example, composed of AlTiC, and the upper and the lower insulating layers 12 and 20, and the protection layers 18a and 18b are, for example, composed of alumina ($Al_2O_3$). In the first and the second thin film recording heads W1 and W2, each of the tip portions of the U-shaped core 16 becomes a lower pole 14 and an upper pole 15, and a space between the lower pole 14 and the upper pole 15 becomes a head gap g.

Also, a lower pole 14b of the second thin film recording head W2 is formed in a similar shape to that formed integrally with a lower pole 14a and the lower magnetic shield layer 13a in the first thin film recording head W1, and therefore it is laminated on an intermediate magnetic shield layer 13b. It is also possible to form the lower pole 14b and the intermediate magnetic shield layer 19 of the second thin film recording head W2 integrally (use in common).

A coil 17 is wound around the core 16, and when current flows through the coil 17, a magnetic filed is generated in the head gap g, and a recording track Tr having approximately the same track width as the width of a pair of the poles 14 and 15 (a head (or head gap) width W (see FIG. 16)) is formed on a magnetic tape.

The first thin film recording head W1 and the second thin film recording head W2 are formed such that they are shifted in a direction orthogonal to the direction of the head gap g (a direction orthogonal also to the direction of lamination), and that the end portions of the pair of the poles 14 and 15, locating on the side on which their respective end portions are adjacent with each other when viewed from the direction of lamination, are overlapped by α, as shown in FIG. 16. In accordance with the thin film multi-recording head 10, a track width Tp of a recording track Tr to be recorded can be smaller than the width W of the pair of the poles 14 and 15, thereby contributing of performing high density of recording density.

Meanwhile, if a thin film multi-recording head, in which N thin film recording heads W1 to W(N) are disposed at a high density, is mounted on a rotary drum and records on a magnetic tape by helical scanning, there occurs deteriorations in accuracy of recording track width among the thin film recording heads W1 to W(N−1), or fluctuations in track width due to the mounting accuracy of the heads that causes the fluctuations, or due to fluctuation components of the drum rotation. This makes it difficult to reproduce by a thin film multi-reproducing head.

SUMMARY OF THE INVENTION

The present invention is accomplished in view of the above-mentioned problem, and has as its object to provide a helical scan type magnetic tape recording apparatus capable of eliminating or reducing the cause of fluctuations such as of the above-mentioned recording track width.

In order to solve the above-mentioned problem, in a helical scan type magnetic tape recording apparatus of the present invention, one thin film multi-recording head is mounted on a rotary drum, wherein the thin film multi-recording head includes N (N is an arbitrary integer of 2 or more) recording heads or head gaps that are able to record recording tracks of channel-1 to channel-(N−1) each having a track width narrower than a head gap width, and records N recording tracks at a predetermined recording track angle on a magnetic tape by one rotation of the rotary drum. It is able to perform helical scan recording for forming continuous recording tracks having the same azimuth angle and the same track pitches free from non-recording portion, by determining the number of rotations of the rotary drum and a tape speed in accordance with the following equation, such that (N−1) recording tracks having the same track pitches narrower than the head gap width and one recording track having a wider track width than that are formed by a first rotation of the rotary drum, then by a second rotation, a preceding recording head overwrites the recording track having the wider track width to form a recording track having a track width equal to the track width of a recording track narrower than the head gap width.

$$V1=Tp \cdot N \cdot (RPS)/\sin \theta,$$

wherein V1 is a tape speed, Tp is a track width, N is the number of head gaps of a thin film multi-recording head, RPS is the number of rotations of the rotary drum per second, and θ is a recording track angle on a magnetic tape.

In a helical scan type magnetic tape recording apparatus of the present invention, M (M is an arbitrary integer) thin film multi-recording heads are mounted on a rotary drum at equally spaced intervals, wherein each of the thin film multi-recording heads includes N (N is an arbitrary integer of 2 or more) recording heads or head gaps that are able to record recording tracks of channel-1 to channel-(N−1) each having a track width narrower than a head gap width, and record (N×M) recording tracks at a predetermined recording track angle on a magnetic tape by one rotation of the rotary drum. It is able to perform helical scan recording for forming continuous recording tracks having the same azimuth angle and the same track pitches free from non-recording portion, by determining the number of rotations of the rotary drum and a tape speed in accordance with the following equation, such that (N−1) recording tracks having the same track pitches narrower than the head gap width and one recording track having a wider track width than that are formed by a first rotation of the rotary drum, then by a second rotation, a preceding recording head overwrites the recording track having the wider track width to form a recording track having a track width equal to the track width of a recording track narrower than the head gap width.

$$V1=Tp \cdot N \cdot (RPS)/\sin \theta \cdot M,$$

wherein M is the number of thin film multi-recording heads.

Alternatively, in a helical scan magnetic tape recording apparatus, one thin film multi-recording head is mounted on a rotary drum, wherein thin film multi-recording head includes N (N is an arbitrary integer of 2 or more) recording heads or head gaps, each of head widths of channel-1 to channel-(N) is narrower than a track pitch, and record N recording tracks with a guard band between recording tracks at a predetermined recording angle on a magnetic tape by one rotation of the rotary drum. It is able to perform helical scan recording for forming continuous recording tracks having the same azimuth angle and the same track pitches, by determining the number of rotations of the rotary drum and a tape speed in accordance with the following equation, such that N recording tracks of the same width as the head width are formed with the same (N−1) track pitches by a first rotation of the rotary drum, then by a second rotation, recording tracks are formed with the same track pitch.

$$V1=T \cdot N \cdot (RPS)/\sin \theta,$$

wherein T is a track pitch.

Alternatively, in a helical scan magnetic tape recording apparatus, M (M is an arbitrary integer of 2 or more) thin film multi-recording heads are mounted on a rotary drum, wherein each of the thin film multi-recording head includes N (N is an arbitrary integer of 2 or more) recording heads or head gaps, each of head widths of channel-1 to channel-(N) is narrower than a track pitch, and record (M×N) recording tracks with a guard band between recording tracks at a predetermined recording angle on a magnetic tape by one rotation of the rotary drum. It is able to perform helical scan recording for forming continuous recording tracks having the same azimuth angle and the same track pitches, by determining the number of rotations of the rotary drum and a tape speed in accordance with the following equation, such that a first thin film multi-recording head forms N recording tracks of the same width as the head width with the same (N−1) track pitches by a first rotation of the rotary drum, then by a second rotation, recording tracks are formed with the same track pitches.

$$V1=T \cdot N \cdot (RPS)/\sin \theta \cdot M$$

As above described, in the magnetic tape recording apparatus of the present invention, one thin film multi-recording head is mounted on the rotary drum, wherein N heads in the thin film multi-recording head are provided to record recording tracks of channel-1 to channel-(N−1) each having a track width narrower than the head width, and in this case, a rotary drum rotation speed and a tape speed are determined by the Equation: $V1=Tp \cdot N \cdot (RPS)/\sin \theta$, so as to form recording tracks each having the same track width. Also, in the magnetic tape recording apparatus mounting, M thin film multi-recording head is mounted on the rotary drum, wherein N heads in each of the thin film multi-recording head are provided to record recording tracks of channel-1 to channel-(N−1) each having a track width narrower than the head width, and in this case, a rotary drum rotation speed and a tape speed are determined by the Equation: $V1=Tp \cdot N \cdot (RPS)/\sin \theta \cdot M$, so as to form recording tracks each having the same track width. Therefore, the recording is performed so as to have the same track width, and it is possible to eliminate or reduce the cause of deterioration in accuracy of recording track width between the recording heads W1 to W(N−1) of the thin film multi-recording head, or the cause of fluctuations in track width due to the mounting accuracy of the heads that cause fluctuations, or due to fluctuation component of the drum rotation.

In the case of increasing the width of the final thin film recording head W(N) of the thin film multi-recording head, it is able to perform recording so as not to cause any non-recording region, even if failed to overwrite in a track width equal to a track width.

In the magnetic tape recording apparatus, one thin film multi-recording head is provided on the rotary drum, wherein N heads are disposed such that the head width of channel-1 to channel-(N) can be recorded smaller than a track pitch and so as to have a guard band between recording tracks, and in this case, a drum rotation speed and a tape speed are determined by the Equation: $V1=T \cdot N \cdot (RPS)/\sin \theta$, so as to have the same track pitch. Also, in the magnetic tape recording apparatus, M thin film multi-recording head are provided on the rotary drum, wherein N heads are disposed such that the head width of channel-1 to channel-(N) can be recorded smaller than a track pitch and so as to have a guard band between recording tracks, and in this case, a drum rotation speed and a tape speed are determined by the Equation: $V1=T \cdot N \cdot (RPS)/\sin \theta \cdot M$, so as to have the same track pitch. Therefore, the track pitches are the same, and it is possible to eliminate or reduce the cause of deterioration in accuracy of a recording track width between the thin film recording heads W1 to W(N) of the thin film multi-recording head, or the cause of fluctuations in track width due to the mounting accuracy of the heads that cause fluctuations, or due to fluctuation compound of the drum rotation.

BRIEF DESCRIPTION OF THE ACCOMPANYING DRAWINGS

FIGS. 10A and 10B are diagrams explaining a circumferential layout of respective thin film heads in a thin film multi-recording head and a thin film multi-reproducing head mounted on a rotary drum;

DESCRIPTION OF THE PREFERRED EMBODIMENS

Figure 1:
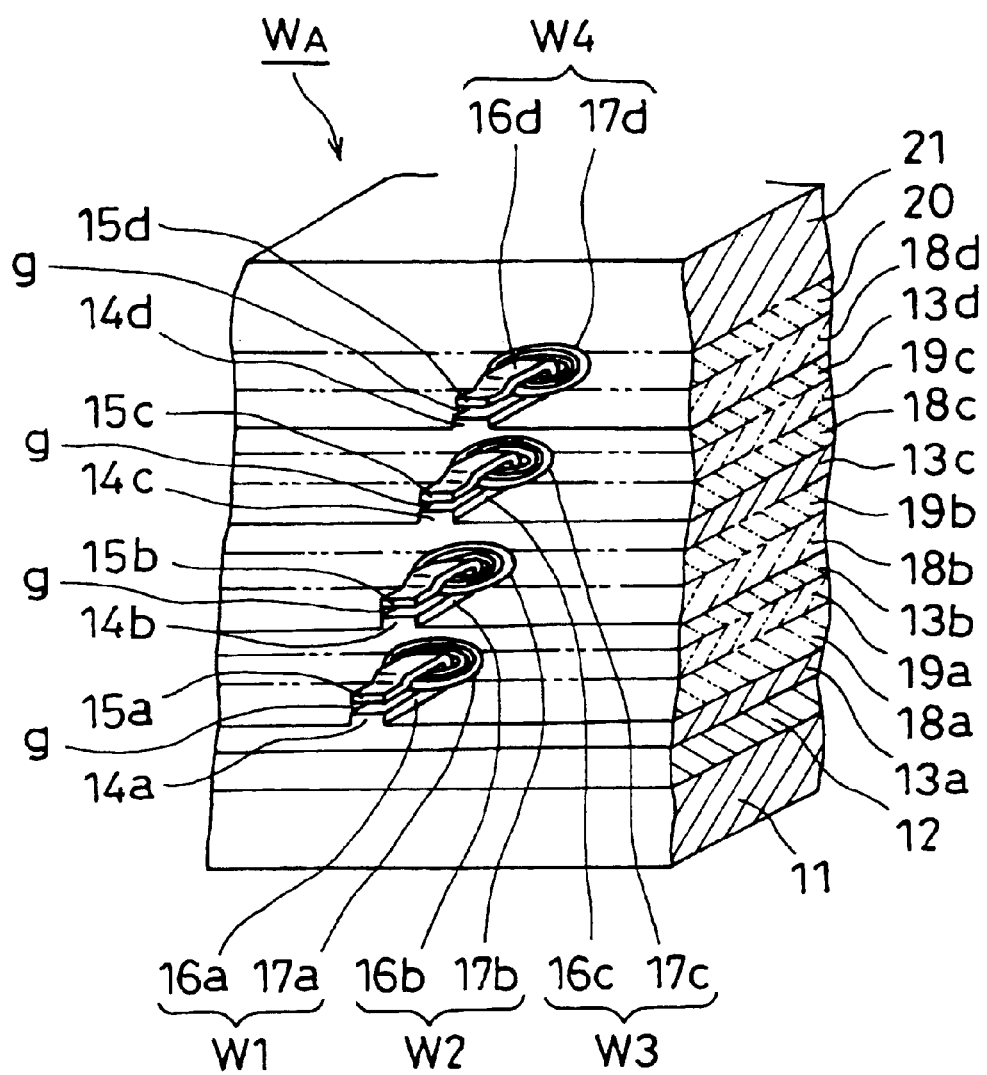
FIG. 1 is a schematic perspective view of a thin film multi-recording head according to a first preferred embodiment.

Details of the present invention will be described below based on respective preferred embodiments shown in the accompanying drawings. FIGS. 1 to 6 show a first preferred embodiment of the present invention, and relate to a magnetic tape recording apparatus in which a thin film multi-recording head WA having N recording heads or head gaps constructed as shown in FIG. 1 is mounted on the peripheral part of a rotary drum 1 as shown in FIG. 3, thereby permitting continuous helical scan recording performing the same azimuth angle and the same track pitch.

The thin film multi-recording head WA mounted on the rotary drum 1 is made by the technique disclosed in the aforesaid Patent Document 3. As shown in FIG. 1, first to fourth thin film recording heads W1 to W4 (the number N=4) having the same azimuth angle are formed so as to be overlapped α at their respective end portions on the adjacent side when viewed from the direction of lamination, and sandwiched from the direction of lamination by two non-magnetic substrates 11 and 21.

A specific construction of the above-mentioned thin film multi-recording head WA is now described. A lower insulating layer 12 and a first lower magnetic shield layer 13a are formed sequentially on the lower non-magnetic substrate 11. An U-shaped core 16a having a first lower pole 14a and a first upper pole 15a is formed integrally with the magnetic shield layer 13a. Around this core, a coil 17a is wound to construct the first thin film recording head W1. A protection layer 18a is provided in the layer where the recording head W1 is formed. A first intermediate magnetic shield layer 19a and a second lower magnetic shield layer 13b are formed sequentially on the protection layer 18a. An U-shaped core 16b having a second lower pole 14b and a second upper pole 15a is formed integrally with the magnetic shield layer 13b. Around this core, a coil 17b is wound to construct the second thin film recording head W2, and a protection layer 18b is formed in the layer where the recording head W2 is formed.

Then, a second intermediate magnetic shield layer 19a and a third lower magnetic shield layer 13c are formed sequentially on the protection layer 18b. An U-shaped core 16c having a third lower pole 14c and a third upper pole 15c is formed integrally with the lower magnetic shield layer 13c. Around this core, a coil 17c is wound to construct the third thin film recording head W3. A protection layer 18c is formed in the layer where the recording head W3 is formed. Further, a third intermediate magnetic shield layer 19c and a fourth lower magnetic shield layer 13d are formed sequentially on the protection layer 18c. An U-shaped core 16d having a fourth lower pole 14d and a fourth upper pole 15d is formed integrally with the lower magnetic shield layer 13d. Around this core, a coil 17d is wound to construct the fourth thin film recording head W4. A protection layer 18d is formed in the layer where the recording head W4 is formed, and an upper insulating layer 20 and an upper non-magnetic substrate 21 are formed sequentially on the protection layer 18c, thereby constructing the thin film multi-recording head WA.

Figure 2:
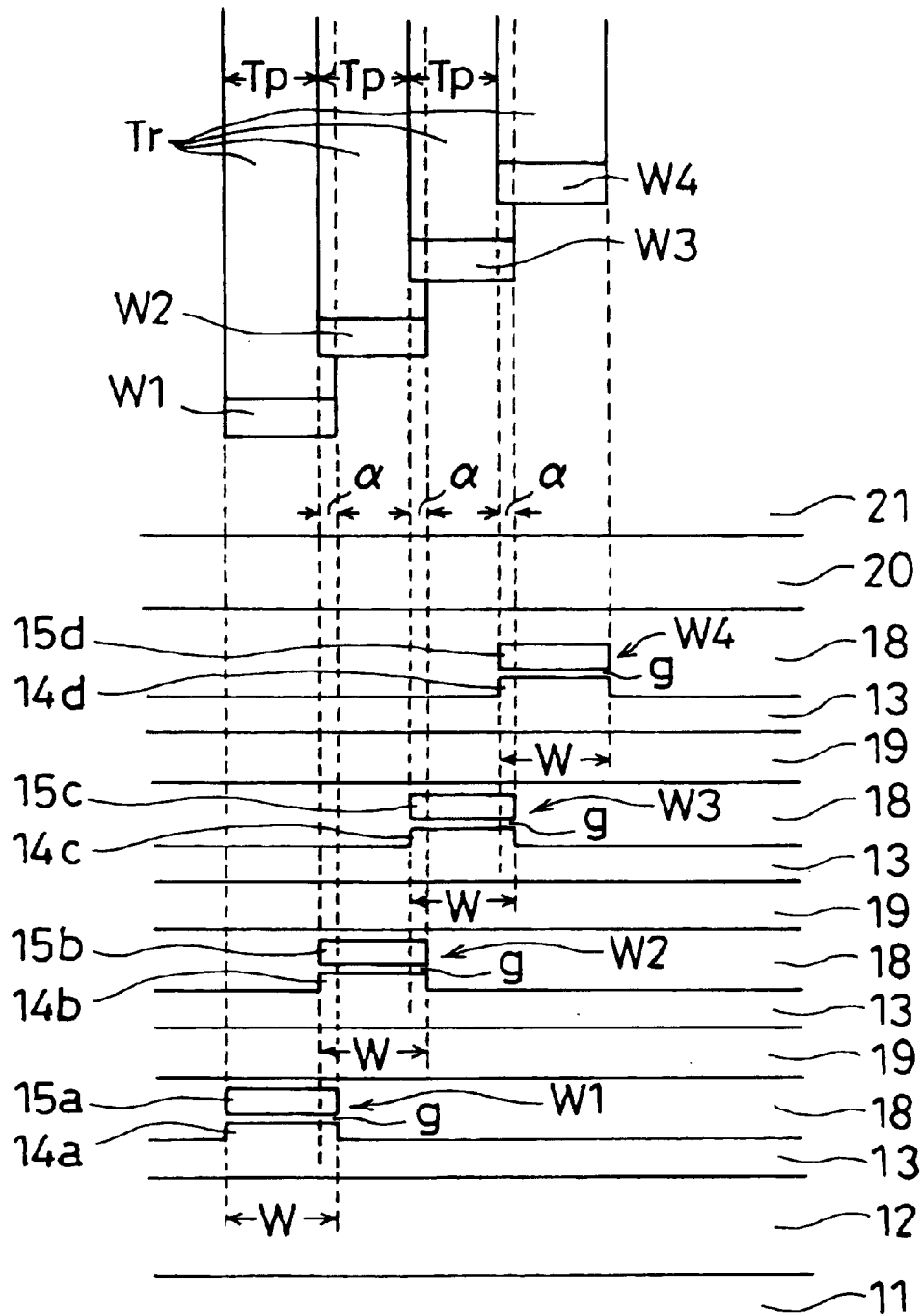
FIG. 2 is a diagram explaining the relationship between a thin film multi-recording head and a recording track.
Figure 3:
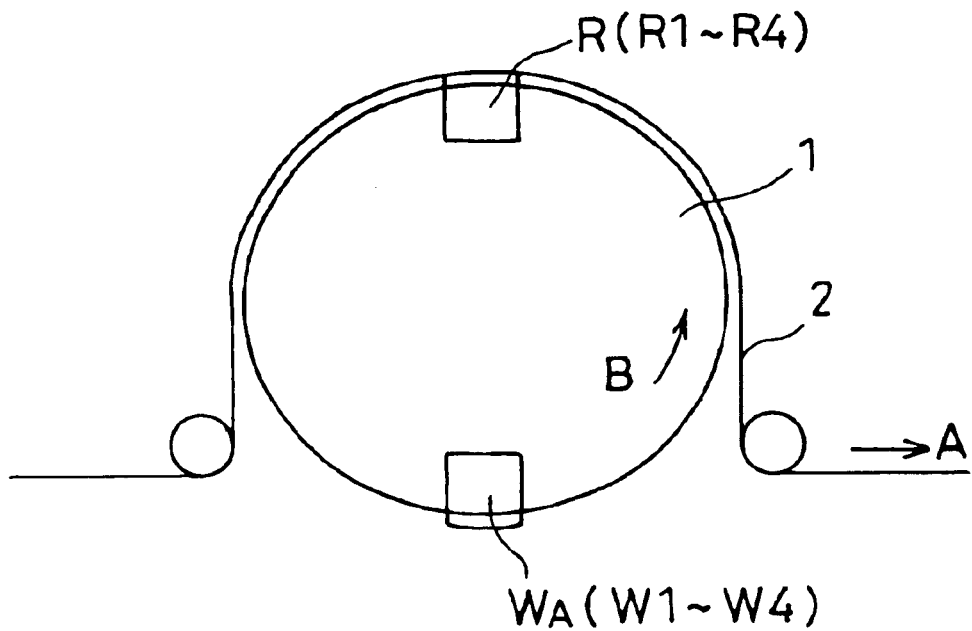
FIG. 3 is a schematic plan view showing the relationship between a rotary drum and a magnetic tape.

The thin film recording heads W1 to W4 are arranged by shifting them so as to partially overlap a in the direction of lamination, as shown in FIG. 2. The thin film recording heads W1 to W4 are formed such that each head width (head gap width) W is approximately 1.2 $\mu$m, a head gap g is approximately 0.1 $\mu$m, and an overlap α is approximately 0.2 $\mu$m.

Respective lower poles 14a to 14d of the thin film recording heads W1 to W4 are formed integrally in a convex shape on the upper surface of the lower magnetic shield layers 13a to 13d. Alternatively, it is also possible to form integrally (use in common) the lower magnetic shield layers 13b to 13d and the intermediate magnetic shield layers 19a to 19c in the thin film recording heads W2 to W4.

Figure 4:
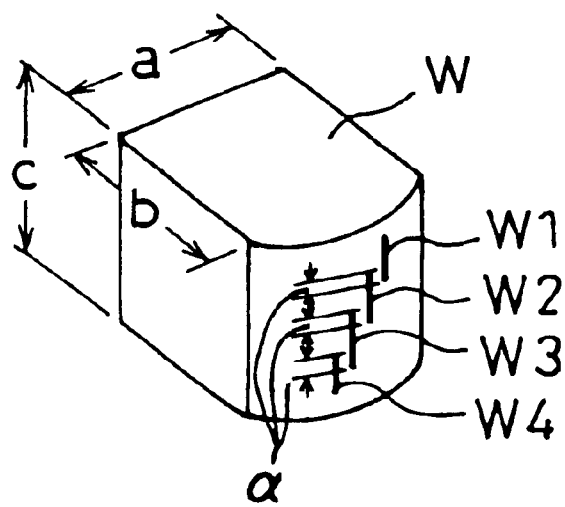
FIG. 4 is a perspective view showing a thin film multi-recording head.

The thin film multi-recording head WA is formed on the front surface in a curved surface shape as shown in FIG. 4, such that the gaps of the thin film recording heads W1 to W4 extend longitudinally. The thin film multi-recording head WA is formed such that its width a and its depth b are approximately 2 to 3 mm, respectively and its thickness c is approximately 0.2 mm.

Figure 6:
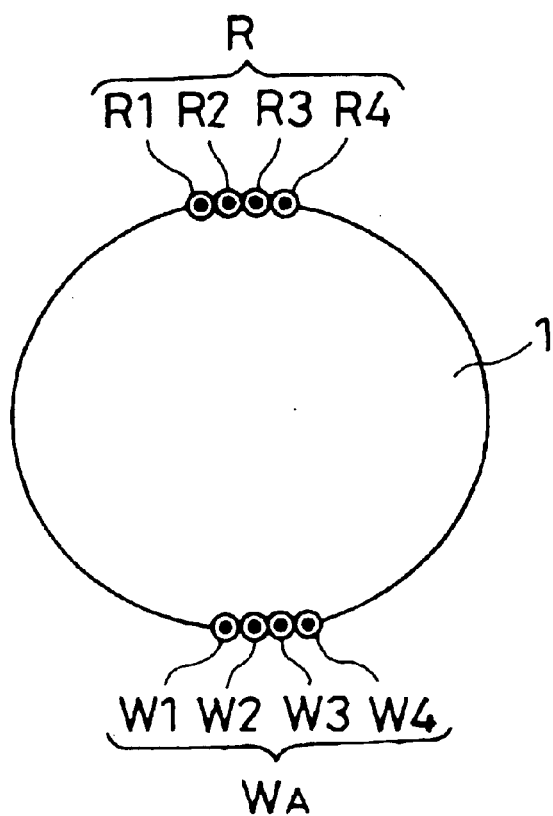
FIG. 6 is a diagram explaining a circumferential layout of respective thin film heads in a thin film multi-recording head and a thin film multi-reproducing head mounted on a rotary drum.

The thin film multi-recording head WA is attached to a circumferential surface of the slanted rotary drum 1 as shown in FIG. 3 and FIG. 6. A thin film multi-reproducing head R having thin film reproducing heads R1 to R4 configured by MR elements and the like is attached at a position 180° apart from the position of the thin film multi-recording head WA of the rotary drum 1. The thin film reproducing heads R1 to R4 of the thin film multi-reproducing multihead R are arranged similarly to the thin film recording heads W1 to W4 in the thin film multi-recording head WA. That is, they are of the same gap arrangement.

The rotary drum 1 is attached in an slanted state so as to permit helical scan recording, and a magnetic tape 2 is wrapped around the peripheral surface of the rotary drum 1 over the range of 180° to run the peripheral surface of the rotary drum 1.

Recording on the magnetic tape 2 is performed simultaneously by allowing the magnetic tape 2 to run in the direction indicated by an arrow A, allowing the rotary drum 1 to rotate in the direction indicated by an arrow B, and allowing the current of the same data to flow through respective coils 17a to 17d of the thin film recording heads W1 to W4 of the thin film multi-recording head WA. If the current flows through the respective coils, a magnetic field is generated in the head gaps g of the thin film recording heads W1 to W4, and each time when the rotary drum 1 rotates once, recording tracks having the same azimuth angle of ch-1 to ch-N ("ch" denotes a channel) are recorded simultaneously on the magnetic tape 2 by the first to Nth thin film recording heads W1 to W4 (W(N)), as shown in FIG. 5A.

Figure 5A:
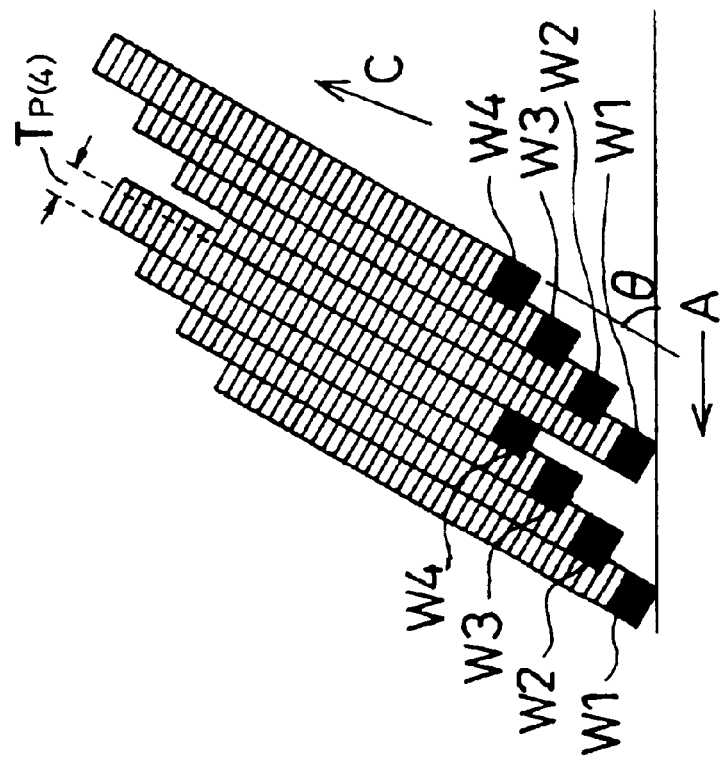
FIGS. 5A and 5B are diagrams explaining an example of recording track pattern.

As shown in FIG. 5A, track widths Tp (1) to Tp (3) of the ch-1 to ch-3 to be recorded by the thin film recording heads W1 to W3 (W(N−1)) are overwritten by the thin film recording heads W2 to W4, thereby to become a track width that is less than the head width W by the amount of overlap α. Whereas a recording track Tr of ch-4 to be recorded by the Nth (the final) thin film recording head W4 (W(N)) is not overwritten, so that its track width Tp (4) is the same as the width W of the thin film recording head W4, and not equal to the track widths Tp (1) to Tp (3) of the ch-1 to ch-3. Further, a non-recording portion is generated between the recording track Tr of the ch-4 to be recorded by the Nth thin film recording head W4 (W(N)) and the recording track Tr of the ch-1 to be recorded by the thin film recording head W1 in the next rotation.

Figure 5B:
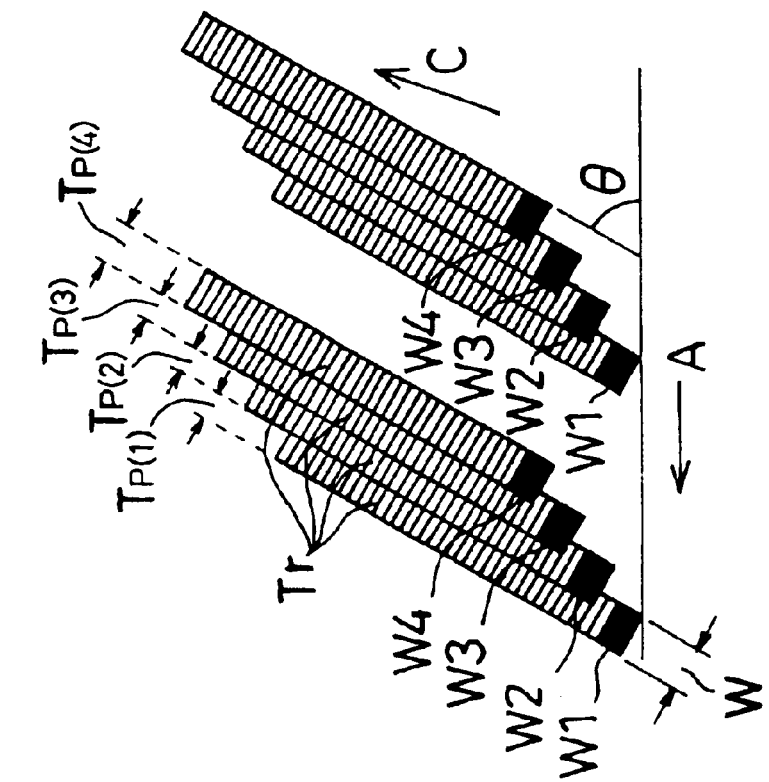

Therefore, as shown in FIG. 5B, the recording is performed by determining the number of rotations of the rotary drum 1 and a tape speed by the following Equation (1), such that part of the recording track Tr of the ch-4 recorded by the Nth thin film recording head W4 in the recording of a first drum rotation is overwritten by the first thin film recording head W1 in the recording of a second drum rotation, thereby making the track width Tp (4) of the ch-4 equal to the track width Tp of the ch-1 to ch-3.

$$V1 = Tp \cdot N \cdot (RPS)/\sin \theta \quad (1),$$

wherein V1 is a tape speed, Tp is a track width, N is the number of head gaps of a thin film multi-recording head, RPS is the number of rotations of the rotary drum per second, and θ is a recording track angle on a magnetic tape.

In accordance with this preferred embodiment, the helical scan magnetic tape recording forming recording tracks having the same azimuth angle and the same track pitch is possible because the number of rotations of the rotary drum and a tape speed are determined by the Equation (1), such that in the first rotation of the rotary drum, (N−1) recording tracks having the same track width Tp narrower than the head width, and one recording track having the track width Tp identical with the head width are formed by the overlapped N thin film recording heads, and that in the second rotation of the rotary drum, the recording track having the same track width Tp as the head width of the first drum rotation can be overwritten in the width equal to the track pitch.

It is therefore possible to eliminate or reduce the cause of deterioration in accuracy of recording track widths between the thin film recording heads W1 to W(N−1) of the thin film multi-recording head, or the cause of fluctuations in track width due to the mounting accuracy of the heads that cause fluctuations, or due to fluctuation component of the drum rotation.

Figure 7:
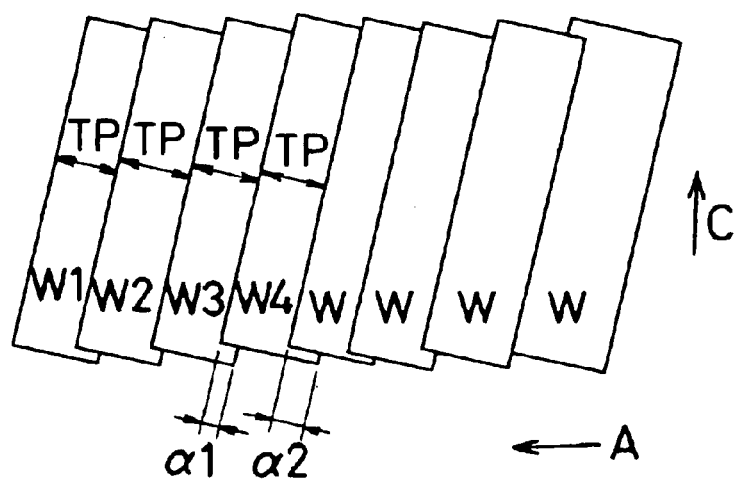
FIG. 7 is a diagram explaining an example of recording track pattern.

Although the thin film recording heads W1 to W4 of the above-mentioned thin film multi-recording head WA are formed in the same head width W, as shown in FIG. 7, the head width W of the final thin film recording head W4 (W(N)) may be formed in a head width having a track width of Tp+α2, which is slightly greater than the head width W of the thin film recording heads W1 to W3 (W(N−1)) having a track width of Tp+α1 (where α2>α1, and α1=α).

As described above, if the head width W of the final thin film recording head W4 of the thin film multi-recording head WA is formed so as to be slightly greater than the head width W of the thin film recording heads W1 to W3, it is able to perform recording so as not to cause any non-recording region, even when in the second and the succeeding head recording, the recording track formed by the thin film multi-recording head W4 having the wide head width cannot be overwritten in the track width equal to the track width formed by the thin film multi-recording heads W1 to W3, due to fluctuations such as of the drum rotation or the tape running.

Figure 8:
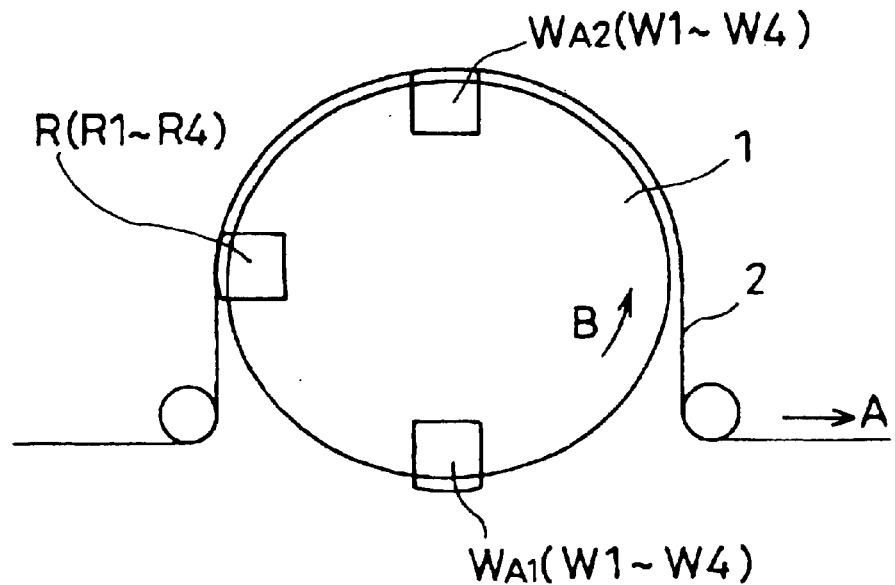
FIG. 8 is a schematic plan view showing the relationship between a rotary drum and a magnetic tape according to a second preferred embodiment.
Figure 9:
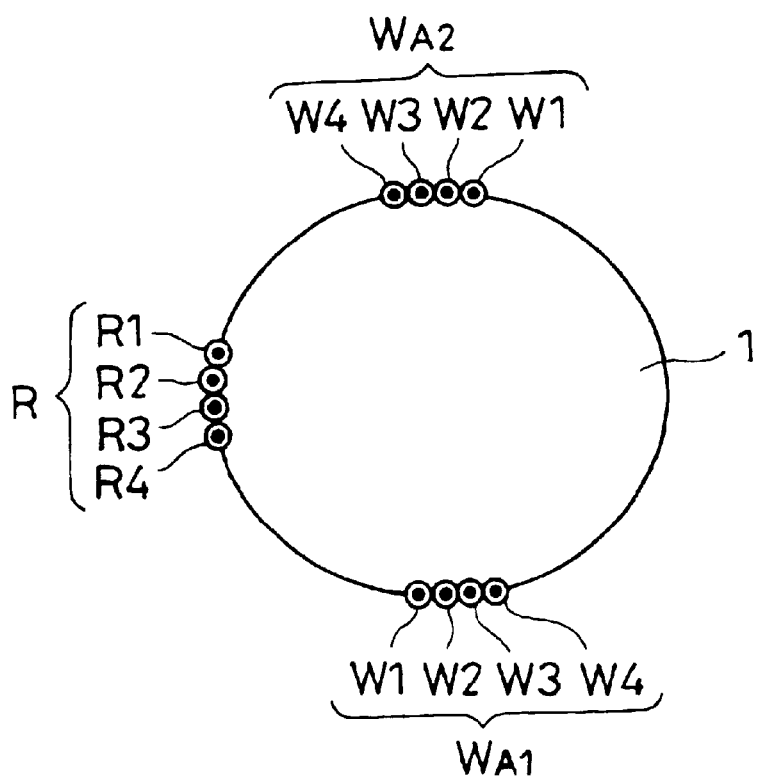
FIG. 9 is a diagram explaining an example of recording track pattern.

A second preferred embodiment of the present invention is shown in FIG. 8 to FIG. 10. This preferred embodiment relates to a magnetic tape recording apparatus that mounts, on a rotary drum 1, N (=4) of M (M=2) thin film multi-recording heads WA (FIG. 1, FIG. 4) as shown in FIG. 8, thereby permitting helical scan recording forming continuous recording tracks having the same azimuth angle and the same track pitch.

The two thin film multi-recording heads WA1 and WA2 are attached to the periphery of the rotary drum 1 so as to be 180° apart from each other and at the same height, as shown in FIG. 8. Also, one thin film multi-reproducing head R having thin film reproducing heads (MR heads or the like) R1 to R4, which have the same number as the number of the thin film multi-recording head WA, is attached to a peripheral position 90° apart from the peripheral positions of the rotary drum 1 where the thin film multi-recording heads WA1 and WA2 are attached. The rotary drum 1 is attached in a slanted attitude to permit the helical scan recording, and a magnetic tape 2 is disposed so as to wrap around the peripheral surface of the rotary drum 1 over the range of 180°.

Recording to the magnetic tape 2 is performed by allowing the magnetic tape 2 to run in the direction indicated by an arrow A, allowing the rotary drum 1 to rotate in the direction indicated by an arrow B, and allowing the current of the same data to flow through respective coils of the thin film recording heads W1 to W4 of the thin film multi-recording head WA1 or WA2, during the rotation of the rotary drum 1 by a 180°.

If the current flows through the coils of the thin film recording heads W1 to W4 of the thin film multi-recording head WA1 or WA2, a magnetic field is generated in the respective head gaps g of the thin film recording heads W1 to W4, and each time when the rotary drum 1 rotates one-half, recording tracks Tr of ch-1 to ch-N having the same azimuth angle are recorded on the magnetic tape 2 by the thin film recording heads W1 to W4 of the thin film multi-recording head WA1 or WA2.

Track widths Tp (1) to Tp (3) of the ch-1 to ch-3, which are recorded by the thin film recording heads W1 to W3

(W(N−1)) of the thin film multi-recording head WA1 or WA2, become a track width Tp that is less than the head width W by the amount of overlap α, as shown in FIG. 10A. Whereas a track width Tp (4) of ch-4 to be recorded by the Nth thin film recording head W4 is the same as the head width W of the thin film recording head W4, and not equal to the track widths T p (1) to Tp (3) of the ch-1 to ch-3, because a recording track by the thin film recording head W1 of the thin film multi-recording head WA2 does not overlap in a second recording. Therefore, the recording is performed by determining the position and height of the thin film multi-recording head, the number of rotations of the rotary drum 1 and a tape speed by the following Equation (2), such that the thin film recording head W1 of the thin film multi-recording head WA2 (or WA1) overwrites so as to overlap with part of the recording track Tr of the ch-N to be recorded by the final thin film recording head W4 (W(N)) of the thin film multi-recording head WA1 (or WA2), thereby making the track width Tp (4) of the ch-4 equal to the track widths Tp (1) to Tp (3) of the ch-1 to ch-3.

$$V1 = Tp \cdot N \cdot (RPS)/\sin \theta \cdot M \quad (2),$$

wherein V1 is a tape speed, Tp is a track width, N is the number of head gaps of a thin film multi-recording head, RPS is the number of rotations of the rotary drum per second, θ is a recording track angle on a magnetic tape, and M is the number of thin film multi-recording heads.

In accordance with this preferred embodiment, the helical scan recording forming continuous recording tracks having the same azimuth angle and the same track pitch, as shown in FIG. 10B, is possible because the position and the height of the thin film recording head, the number of rotations of the rotary drum and a tape speed are determined by the above Equation (2), such that in the first rotation of the rotary drum, one thin film multi-recording head WA1 forms (N−1) recording tracks of the ch-1 to ch-(N−1) having the same (N−1) track width Tp, and one recording track of ch-N having a wider width than that, and that the first recording head W1 of the second thin film multi-recording head WA2 overwrites the previous Nth recording track in the (N−1) track widths Tp.

It is therefore possible to eliminate or reduce the cause of deterioration in accuracy of a recording track width between the thin film recording heads W1 to W(N−1) of the respective multi-recording heads, or the cause of fluctuations in track width due to the mounting accuracy of the heads that cause fluctuations, or due to fluctuation compound of the drum rotation.

Although the thin film multi-recording heads W1 to W4 of the above-mentioned thin film multi-recording head WA are formed in the same head width W, as in FIG. 7 described above, by forming the head width W of the final thin film recording head W4 of the thin film multi-recording head so as to be slightly greater than the head width W of the thin film recording heads W1 to W3, it is able to perform recording so as not to cause any non-recording region, even when in the second and the succeeding head recording, the recording track recorded by the thin film multi-recording head W4 having the wide width cannot be overwritten in the track width equal to the track width recorded by the thin film multi-recording heads W1 to W3, due to fluctuations such as of drum rotation or tape running.

Figure 11:
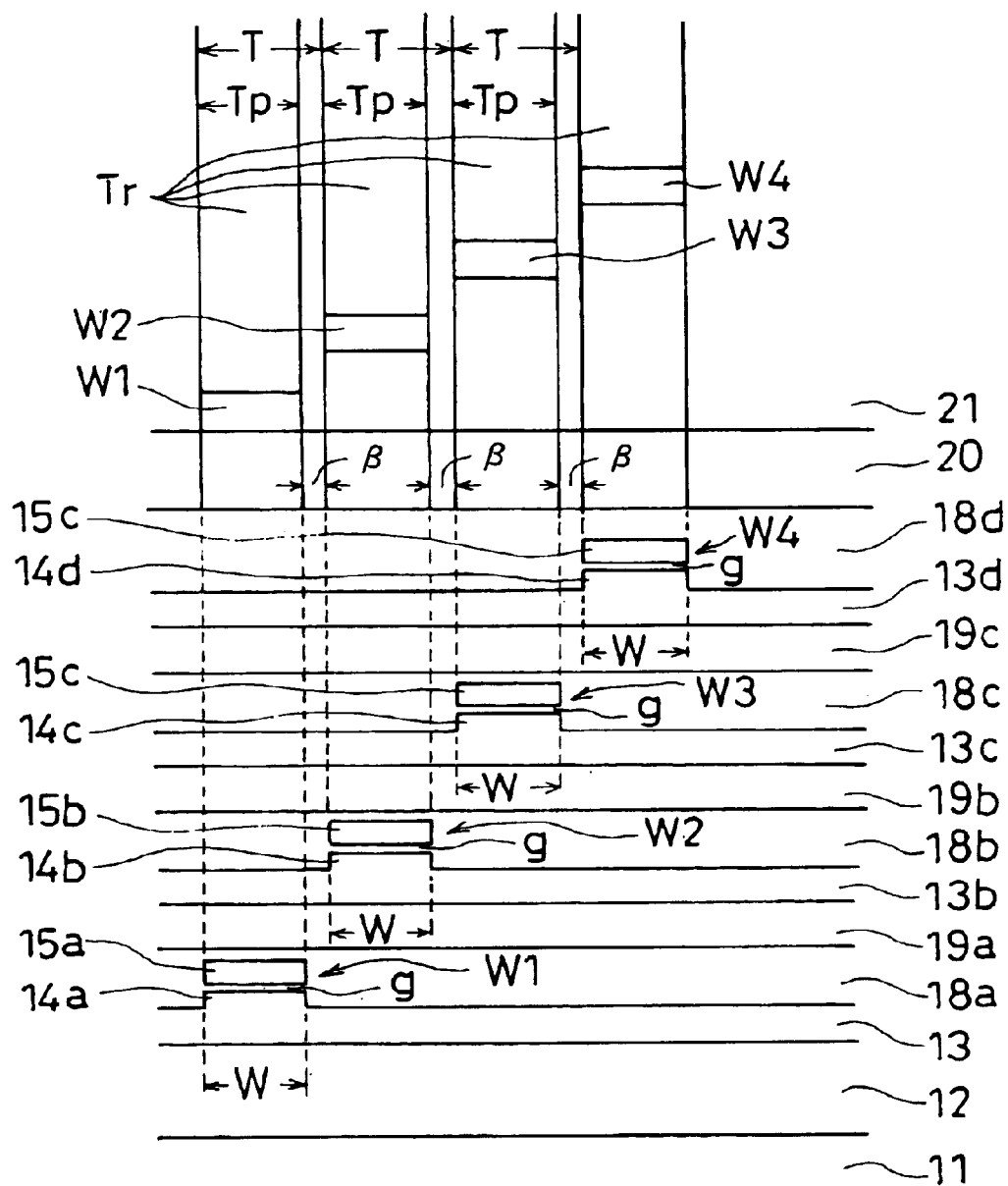
FIG. 11 is a diagram explaining the relationship between a thin film multi-recording head and a recording track according to a third preferred embodiment.
Figure 12:
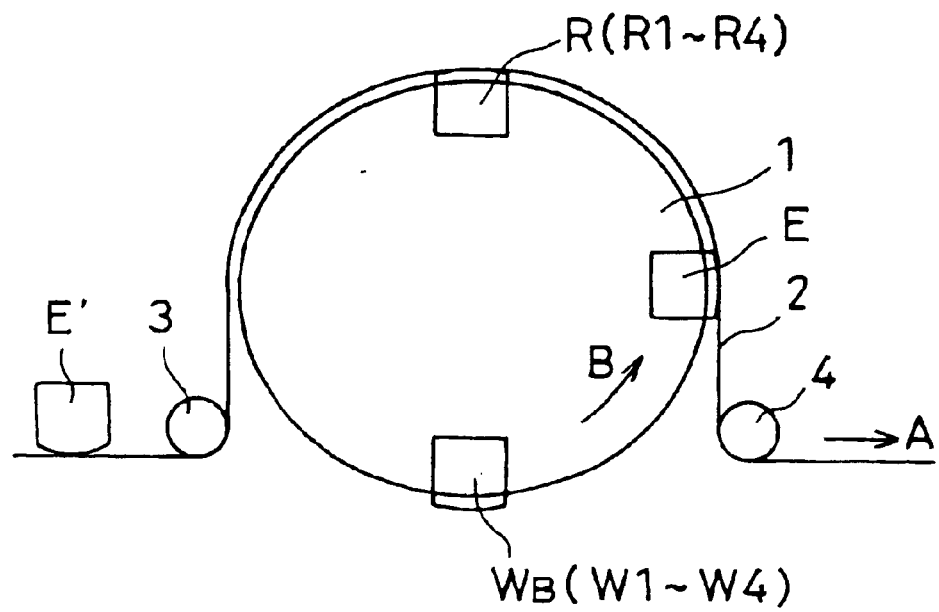
FIG. 12 is a schematic plan view showing the relationship between a rotary drum and a magnetic tape.
Figure 13A:
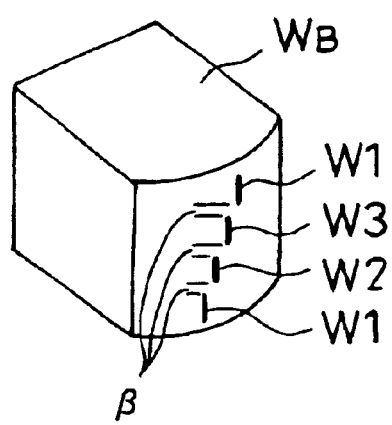
FIGS. 13A and 13B are perspective views showing a thin film multi-recording head and an erase head.
Figure 13B:
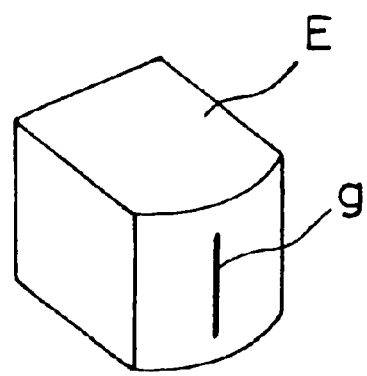

FIG. 11 to FIG. 14 show a third preferred embodiment of the present invention, and relates to a magnetic tape recording apparatus in which one thin film multi-recording head WB being constructed as shown in FIG. 11 and FIG. 13A, and having the number of N recording heads or head gaps is mounted on a rotary drum 1 as shown in FIG. 11, thereby permitting helical scan recording forming continuous recording tracks having the same azimuth angle and the same track pitch.

This thin film multi-recording head WB is constructed such that when recording, a recording track Tr of a track width Tp, which is the same as a head width of thin film recording heads W1 to W4 (W(N)), is formed so as to have a guard band β between recording tracks Tr, as shown in FIG. 13. That is, as shown in FIG. 11 and FIG. 13A, there is constructed such that the end portions of the thin film recording heads W1 to W4 are spaced by the amount of the guard band β, when viewed in the direction of lamination, as shown in FIG. 13A. Except for this point, the thin film multi-recording head WB is constructed similarly to the thin film multi-recording head WA in FIG. 1. Accordingly, the same components bear the same references, and overlapping descriptions are omitted.

One thin film multi-recording head WB is mounted in the peripheral part of the rotary drum 1, as shown in FIG. 12. One thin film multi-reproducing head R having thin film reproducing heads (MR heads or the like) R1 to R4 is attached to a position 180° away from the peripheral position to which the thin film multi-recording head WB of the rotary drum 1 is attached. Further, in order to perform recording such that non-recorded area is left between recording tracks (in the guard band portion), an erasing head E or E' (FIG. 13B) having a longitudinally long gap g is mounted on the rotary drum 1, or disposed in the vicinity of a guide roller 3. The rotary drum 1 is attached in a slanted attitude to permit the helical scan recording, and a magnetic tape 2 is disposed so as to run around the peripheral surface of the rotary drum 1 in the range of 180°.

Recording to the magnetic tape 2 is performed by allowing the magnetic tape 2 to run in the direction A indicated by the arrow A, allowing the rotary drum 1 to rotate in the direction B indicated by the arrow B, and allowing current to flow through respective coils (not shown) of the thin film recording heads W1 to W4 of the thin film multi-recording head WB, during the time that the thin film multi-recording head WB is in contact with the magnetic tape 2.

Figure 14:
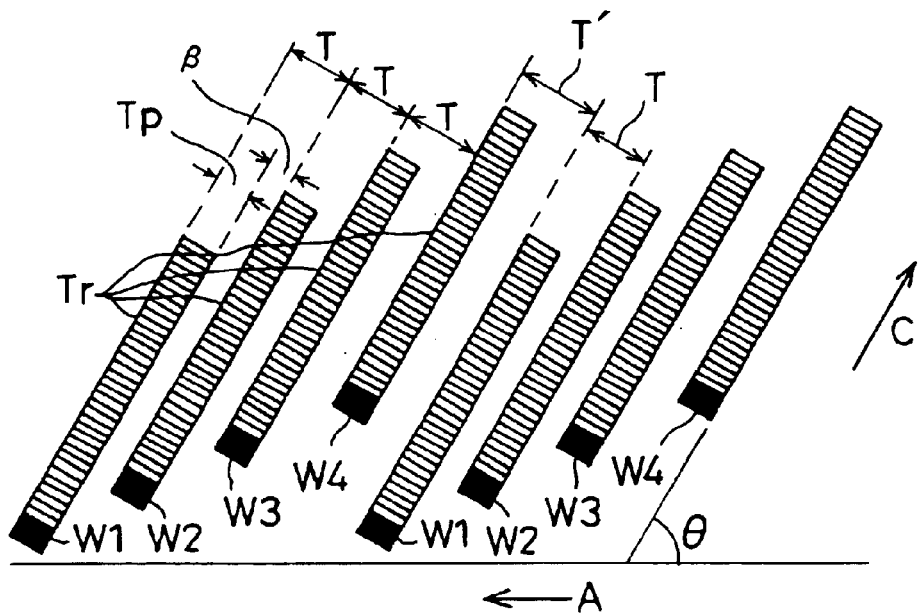
FIG. 14 is a diagram explaining an example of recording track pattern.
Figure 15:
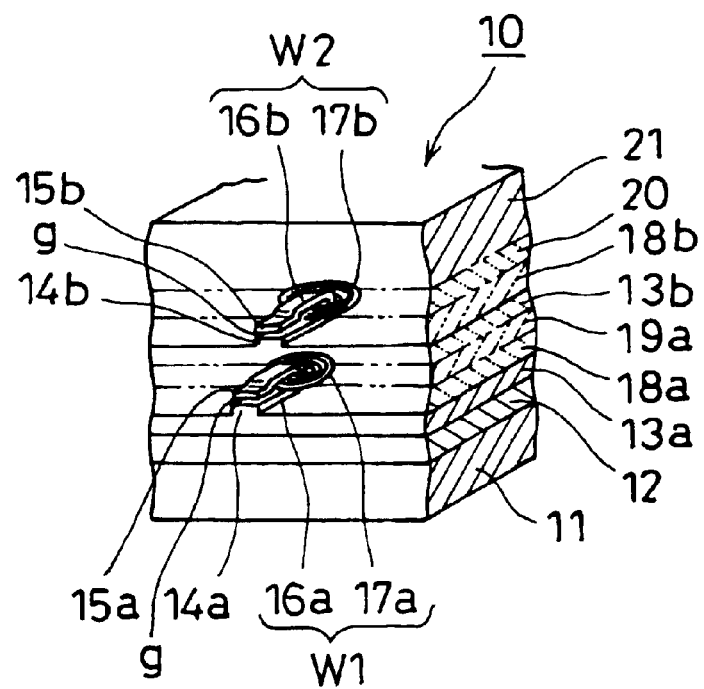
FIG. 15 is a schematic perspective view of a conventional thin film multi-recording head.
Figure 16:
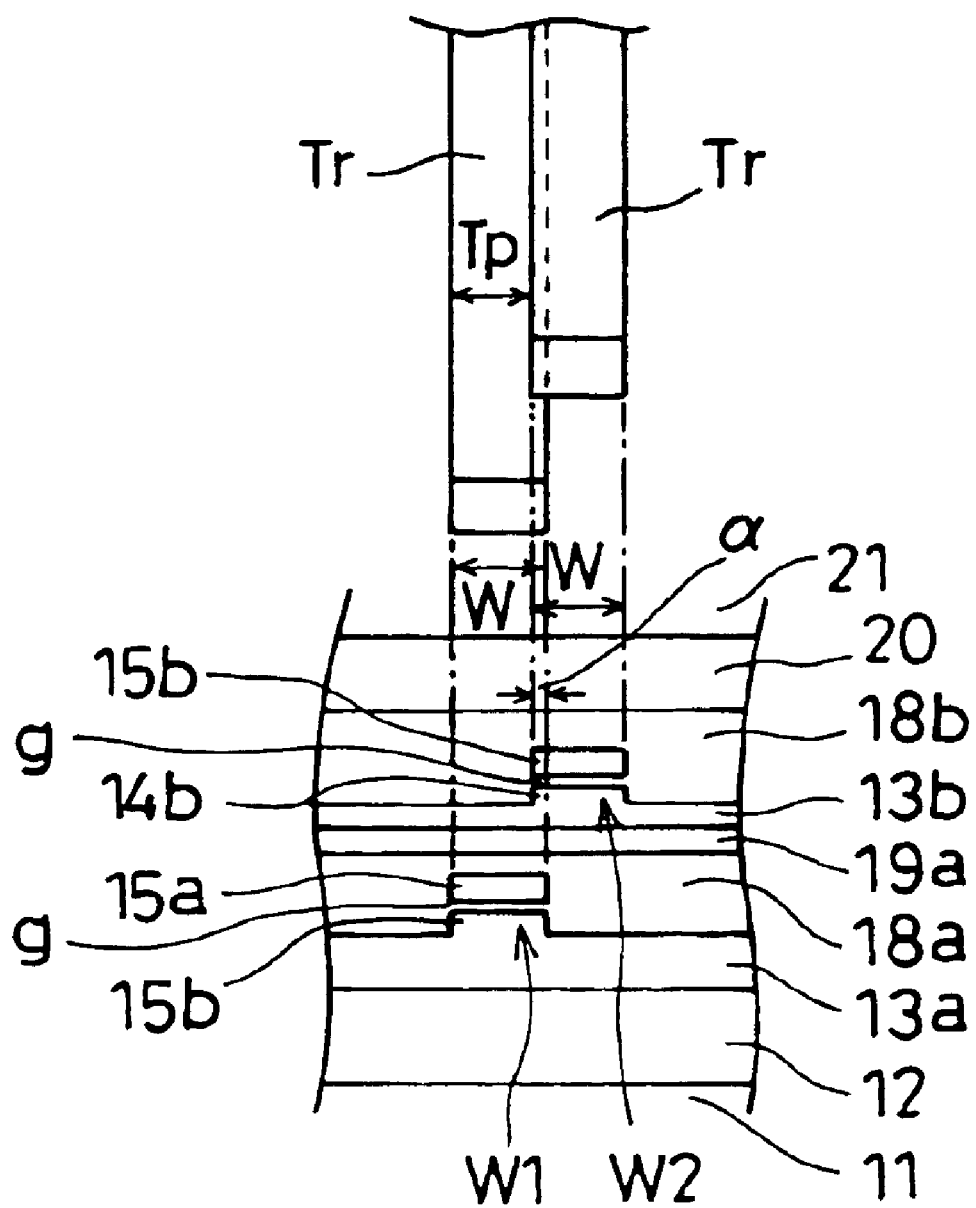
FIG. 16 is a diagram explaining the relationship between a thin film multi-recording head and a recording track.

If the current of data to be recorded flows through the coils of the thin film recording heads W1 to W4 of the thin film multi-recording head WB, a magnetic field is generated in the gaps g of the thin film recording heads W1 to W4, and each time when the rotary drum rotates once, recording tracks having the same azimuth angle of ch-1 to ch-N are recorded simultaneously on the magnetic tape 2 by the first to the Nth thin film recording heads W1 to W4 (W(N)) of the thin film multi-recording head WB, as shown in FIG. 14.

A track pitch T of recording tracks Tr of the ch-1 to ch-3, which are recorded by the first to the (N−1)th thin film recording heads W1 to W3 (W(N−1)) in the first rotation of the thin film multi-recording head WB, is a track width of TP (=a head width W)+guard band β. Whereas a spacing (a track pitch of the ch-4) T' between a recording track Tr of the ch-4 recorded by the Nth thin film recording head W4 (W(N)) in the first rotation and a recording track Tr of the ch-1 recorded by the first thin film recording head W1 in the second rotation is not the same as the above-mentioned track pitch T of the recording tracks Tr of the ch-1 to ch-3.

Therefore, the recording is performed by determining the number of rotations of the rotary drum and a tape speed by the following Equation (3), such that the spacing T' is the same as the track pitch T of the recording tracks Tr recorded by the thin film recording heads W1 to W3 (W(N−1)).

$$V1 = T \cdot N \cdot (RPS)/\sin \theta \quad (3),$$

wherein V1 is a tape speed, T is a track pitch, N is the number of head gaps of a thin film multi-recording head, RPS is the number of rotations of the rotary drum per second, and θ is a recording track angle on a magnetic tape.

In accordance with this preferred embodiment, the number of rotations of the rotary drum and a tape speed are determined by the Equation (3), so as to form the same track pitch T, thereby enabling helical scan recording forming continuous recording tracks having the same azimuth angle, the same guard band and the same track pitch.

It is therefore possible to eliminate or reduce the cause in accuracy of a recording track width between the thin film recording heads W1 to W(N) of the thin film multi-recording head, or the cause of fluctuations in track width due to the mounting accuracy of the heads that cause fluctuations, or due to fluctuation component of the drum rotation.

Although this preferred embodiment is an example where one thin film multi-recording head WB is mounted on the rotary drum 1, if M thin film multi-recording heads WB are mounted at equally spaced intervals on the rotary drum 1, the number of rotations of the rotary drum and the tape speed 2 are determined by the following Equation (4), such that N recording tracks Tr of the same track width Tp and the same (N−1) track pitches are formed in recording with a first thin film multi-recording head, and the same track pitch T is formed in recording with a second thin film multi-recording head.

$$V1 = T \cdot N \cdot (RPS)/\sin \theta \cdot M \quad (4)$$

What is claimed is:

1. A helical scan type magnetic tape recording apparatus including one thin film multi-recording head mounted on a rotary drum, wherein said thin film multi-recording head includes N (N is an arbitrary integer of 2 or more) recording heads that are able to record recording tracks of channel-1 to channel-(N−1) each having a track width narrower than a head width, and records N recording tracks at a predetermined recording track angle on a magnetic tape by one rotation of the rotary drum, wherein;

helical scan recording is performed by forming continuous recording tracks having the same azimuth angle and the same track pitches free from non-recording portion, by determining the number of rotations of the rotary drum and a tape speed in accordance with the following equation, such that (N−1) recording tracks having the same track pitches, equal to track widths, narrower than the head width and one recording track having a wider track width than that are formed by a first rotation of the rotary drum, then by a second rotation, a preceding recording head overwrites the recording track having the wider track width to form a recording track having a track width equal to the track width of a recording track narrower than the head width;

$$V1 = Tp \cdot N \cdot (RPS)/\sin \theta,$$

wherein V1 is a tape speed, Tp is a track width, N is the number of heads of a thin film multi-recording head, RPS is the number of rotations of the rotary drum per second, and θ is a recording track angle on a magnetic tape.

2. The helical scan type magnetic tape recording apparatus as cited in claim 1, wherein:

said thin film multi-recording head is formed by laminating on a thin film recording head which is configured by laminating a pair of thin film magnetic poles having a gap on an non-magnetic substrate via an insulation layer in this order;

a magnetic shield layer;

a pair of thin film magnetic poles having a gap; and magnetic shield layer in a direction of lamination in this order; and laminated plural pairs of thin film magnetic poles are formed while shifting in the a direction of lamination so as to be partially overlapped.

3. The helical scan type magnetic tape recording apparatus as cited in claim 1, wherein:

in said multi-recording head, a head width of channel-N for recording the last recording track is wider than the head width of each of channel-1 to channel-(N−1), so that a non-recording is not formed even if the track having the wider track width is not overwritten to be the same track width with the recording by the second and later rotation of the rotary drum or by the second head or later head due to the fluctuation of drum rotation or the tape run.

4. The helical scan type magnetic tape recording apparatus as cited in claim 3, wherein:

said thin film multi-recording head is formed by laminating on a thin film recording head which is configured by laminating a pair of thin film magnetic poles having a gap on an non-magnetic substrate via an insulation layer in this order;

a magnetic shield layer;

a pair of thin film magnetic poles having a gap; and magnetic shield layer in a direction of lamination in this order; and laminated plural pairs of thin film magnetic poles are formed while shifting in the a direction of lamination so as to be partially overlapped.

5. A helical scan type magnetic tape recording apparatus including M (M is an arbitrary integer) thin film multi-recording heads mounted on a rotary drum at equally spaced intervals, wherein each of said thin film multi-recording heads includes N (N is an arbitrary integer of 2 or more) recording heads that are able to record recording tracks of channel-1 to channel-(N−1) each having a track width narrower than a head width, and record (N×M) recording tracks at a predetermined recording track angle on a magnetic tape by one rotation of the rotary drum, wherein;

helical scan recording is performed by forming continuous recording tracks having the same azimuth angle and the same track pitches free from non-recording portion, by determining the number of rotations of the rotary drum and a tape speed in accordance with the following equation, such that (N−1) recording tracks having the same track pitches, equal to track widths, narrower than the head width and one recording track having a wider track width than that are formed by a first rotation of the rotary drum, then by a second rotation, a preceding recording head overwrites the recording track having the wider track width to form a recording track having a track width equal to the track width of a recording track narrower than the head width;

$$V1 = Tp \cdot N \cdot (RPS)/\sin \theta \cdot M,$$

wherein V1 is a tape speed, Tp is a track width, N is the number of heads of a thin film multi-recording head, RPS is the number of rotations of the rotary drum per second, θ is a recording track angle on a magnetic tape, and M is the number of thin film multi-recording heads.

6. The helical scan type magnetic tape recording apparatus as cited in claim 5, wherein;
   said thin film multi-recording head is formed by laminating on a thin film recording head which is configured by laminating a pair of thin film magnetic poles having a gap on an non-magnetic substrate via an insulation layer in this order;
   a magnetic shield layer;
   a pair of thin film magnetic poles having a gap; and
   magnetic shield layer in a direction of lamination in this order; and
   laminated plural pairs of thin film magnetic poles are formed while shifting in the a direction of lamination so as to be partially overlapped.

7. The helical scan type magnetic tape recording apparatus as cited in claim 5, wherein;
   in said multi-recording head, a head width of channel-N for recording the last recording track is wider than the head width of each of channel-1 to channel-(N−1), so that a non-recording is not formed even if the track having the wider track width is not overwritten to be the same track width with the recording by the second and later rotation of the rotary drum or by the second head or later head due to the fluctuation of drum rotation or the tape run.

8. The helical scan type magnetic tape recording apparatus as cited in claim 7, wherein;
   said thin film multi-recording head is formed by laminating on a thin film recording head which is configured by laminating a pair of thin film magnetic poles having a gap on an non-magnetic substrate via an insulation layer in this order;
   a magnetic shield layer;
   a pair of thin film magnetic poles having a gap; and
   magnetic shield layer in a direction of lamination in this order; and
   laminated plural pairs of thin film magnetic poles are formed while shifting in the a direction of lamination so as to be partially overlapped.

9. A helical scan magnetic tape recording apparatus including one thin film multi-recording head mounted on a rotary drum, wherein said thin film multi-recording head includes N (N is an arbitrary integer of 2 or more) recording heads, each of head widths of channel-1 to channel-(N) is narrower than a track pitch, and records N recording tracks with a guard band between recording tracks at a predetermined recording angle on a magnetic tape by one rotation of the rotary drum, wherein;
   helical scan recording is performed by forming continuous recording tracks having the same azimuth angle and the same track pitches,
   by determining the number of rotations of the rotary drum and a tape speed in accordance with the following equation, such that N recording tracks of the same width as the head width are formed with the same (N−1) track pitches by a first rotation of the rotary drum, then by a second rotation, recording tracks are formed with the same track pitch;

$$V1 = T \cdot N \cdot (RPS)/\sin \theta,$$

wherein V1 is a tape speed, T is a track pitch, N is the number of heads of a thin film multi-recording head, RPS is the number of rotations of the rotary drum per second, and θ is a recording track angle on a magnetic tape.

10. The helical scan type magnetic tape recording apparatus as cited in claim 9, wherein;
    said thin film multi-recording head is formed by laminating on a thin film recording head which is configured by laminating a pair of thin film magnetic poles having a gap on an non-magnetic substrate via an insulation layer in this order;
    a magnetic shield layer;
    a pair of thin film magnetic poles having a gap; and
    magnetic shield layer in a direction of lamination in this order; and
    laminated plural pairs of thin film magnetic poles are formed while shifting relative to the end of adjacent side in the a direction of lamination so as to form the guard-band.

11. The helical scan type magnetic tape recording apparatus as cited in claim 9, further comprising:
    one or more than one erasing head inside or outside the rotary drum to make the guard-band portion in erasing condition.

12. The helical scan type magnetic tape recording apparatus as cited in claim 11, wherein;
    said thin film multi-recording head is formed by laminating on a thin film recording head which is configured by laminating a pair of thin film magnetic poles having a gap on an non-magnetic substrate via an insulation layer in this order;
    a magnetic shield layer;
    a pair of thin film magnetic poles having a gap; and
    magnetic shield layer in a direction of lamination in this order; and
    laminated plural pairs of thin film magnetic poles are formed while shifting relative to the end of adjacent side in the a direction of lamination so as to form the guard-band.

13. A helical scan magnetic tape recording apparatus including M (M is an arbitrary integer of 2 or more) thin film multi-recording heads mounted on a rotary drum, wherein each of said thin film multi-recording head includes N (N is an arbitrary integer of 2 or more) recording heads, each of head widths of channel-1 to channel-(N) is narrower than a track pitch, and records (M×N) recording tracks with a guard band between recording tracks at a predetermined recording angle on a magnetic tape by one rotation of the rotary drum, wherein;
   helical scan recording is performed by forming continuous recording tracks having the same azimuth angle and the same track pitches,
   by determining the number of rotations of the rotary drum and a tape speed in accordance with the following equation, such that a first thin film multi-recording head forms N recording tracks of the same width as the head width with the same (N−1) track pitches by a first rotation of the rotary drum, then by a second rotation, recording tracks are formed with the same track pitches;

$$V1 = T \cdot N \cdot (RPS)/\sin \theta \cdot M,$$

wherein V1 is a tape speed, T is a track pitch, N is the number of heads of a thin film multi-recording head, RPS is the number of rotations of the rotary drum per second, θ is a recording track angle on a magnetic tape, and M is the number of thin film multi-recording heads.

14. The helical scan type magnetic tape recording apparatus as cited in claim 13, wherein;
- said thin film multi-recording head is formed by laminating on a thin film recording head which is configured by laminating a pair of thin film magnetic poles having a gap on an non-magnetic substrate via an insulation layer in this order;
- a magnetic shield layer;
- a pair of thin film magnetic poles having a gap; and
- magnetic shield layer in a direction of lamination in this order; and
- laminated plural pairs of thin film magnetic poles are formed while shifting relative to the end of adjacent side in the a direction of lamination so as to form the guard-band.

15. The helical scan type magnetic tape recording apparatus as cited in claim 13, further comprising:
- one or more than one erasing head inside or outside the rotary drum to make the guard-band portion in erasing condition.

16. The helical scan type magnetic tape recording apparatus as cited in claim 15, wherein;
- said thin film multi-recording head is formed by laminating on a thin film recording head which is configured by laminating a pair of thin film magnetic poles having a gap on an non-magnetic substrate via an insulation layer in this order;
- a magnetic shield layer;
- a pair of thin film magnetic poles having a gap; and
- magnetic shield layer in a direction of lamination in this order; and
- laminated plural pairs of thin film magnetic poles are formed while shifting relative to the end of adjacent side in the a direction of lamination so as to form the guard-band.

* * * * *